United States Patent
Kim et al.

(10) Patent No.: US 10,161,017 B2
(45) Date of Patent: Dec. 25, 2018

(54) METHOD FOR CRUSHING HARD TUNGSTEN CARBIDE SCRAPS

(71) Applicant: KOREA INSTITUTE OF GEOSCIENCE AND MINERAL RESOURCES, Daejeon (KR)

(72) Inventors: Byung-Su Kim, Gunsan-si (KR); Hanjung Kwon, Daejeon (KR); Ki-Min Roh, Daejeon (KR); Chang-Youl Suh, Daejeon (KR); Ji-Hyuk Choi, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 247 days.

(21) Appl. No.: 15/156,996

(22) Filed: May 17, 2016

(65) Prior Publication Data

US 2016/0355907 A1 Dec. 8, 2016

(30) Foreign Application Priority Data

Jun. 8, 2015 (KR) .......... 10-2015-0080502
Jun. 8, 2015 (KR) .......... 10-2015-0080503

(51) Int. Cl.
*C22C 29/08* (2006.01)
*C22B 7/00* (2006.01)
(Continued)

(52) U.S. Cl.
CPC ............ *C22B 34/36* (2013.01); *B01F 3/2284* (2013.01); *C22B 1/005* (2013.01); *C22B 3/065* (2013.01);
(Continued)

(58) Field of Classification Search
CPC .. C22B 1/005; C22B 3/06; C22B 3/12; C22B 7/007; C22B 7/008; C22B 23/0415;
(Continued)

(56) References Cited

U.S. PATENT DOCUMENTS

| 3,438,730 A * | 4/1969 | Shwayder ............ C09K 3/1409 423/440 |
| 2015/0376744 A1* | 12/2015 | Konyashin .............. C22C 26/00 51/309 |
| 2016/0115085 A1* | 4/2016 | Norgren ............... C09K 3/1409 423/440 |

FOREIGN PATENT DOCUMENTS

| CN | 1054270 | 9/1991 |
| CN | 102433486 A * | 5/2012 |

(Continued)

OTHER PUBLICATIONS

JP H0432523 A machine translation of the description (Year: 1992).*

(Continued)

*Primary Examiner* — George Wyszomierski
*Assistant Examiner* — Tima M McGuthry-Banks
(74) *Attorney, Agent, or Firm* — Hauptman Ham, LLP

(57) ABSTRACT

Provided are a method for crushing hard tungsten carbide (WC) scraps which is a pre-step of alkaline leaching and acid leaching processes for recycling of tungsten and cobalt, the method including mixing hard tungsten carbide (WC) scraps such as chips, wires, bolts, drills, etc., that are metalworking tools to be discarded after being used, with aluminum, followed by heating to a high temperature, to form an intermetallic compound, metal oxides, or mixtures thereof in a sponge form, and crushing the intermetallic compound, the metal oxides, or the mixtures thereof in a sponge form. Further, provided is a method for recovering tungsten and cobalt from hard tungsten carbide (WC) scrap (Continued)

powder through alkaline leaching and acid leaching methods.

8 Claims, 4 Drawing Sheets

(51) Int. Cl.
    *C22B 3/22*     (2006.01)
    *C22B 3/12*     (2006.01)
    *C22B 3/06*     (2006.01)
    *C22B 1/00*     (2006.01)
    *B01F 3/22*     (2006.01)
    *C22B 34/36*     (2006.01)
    *C22B 3/14*     (2006.01)
    *C22B 3/10*     (2006.01)
    *C22B 3/08*     (2006.01)
    *C22B 3/00*     (2006.01)

(52) U.S. Cl.
    CPC ................. *C22B 3/08* (2013.01); *C22B 3/10* (2013.01); *C22B 3/12* (2013.01); *C22B 3/14* (2013.01); *C22B 3/22* (2013.01); *C22B 7/007* (2013.01); *C22B 7/008* (2013.01); *C22B 23/043* (2013.01); *C22B 23/0415* (2013.01); *C22B 23/0423* (2013.01); *C22B 23/0438* (2013.01); *C22B 23/0446* (2013.01); *C22B 23/0453* (2013.01); *C22C 29/08* (2013.01); *Y02P 10/218* (2015.11); *Y02P 10/234* (2015.11)

(58) Field of Classification Search
    CPC . C22B 23/0446; C22B 23/0453; C22B 3/065; C22B 3/22; Y02P 10/234; Y02P 10/218; B01F 3/2284; B01F 2009/001; B01F 2201/50; B01F 2301/052; C22C 29/08
    See application file for complete search history.

(56) References Cited

FOREIGN PATENT DOCUMENTS

| | | |
|---|---|---|
| CN | 102725429 | 10/2012 |
| CN | 105154707 A * | 12/2015 |
| JP | H0432523 | 2/1992 |
| KR | 101226614 B1 | 1/2013 |
| KR | 101431706 B1 | 8/2014 |
| KR | 20140147614 A | 12/2014 |

OTHER PUBLICATIONS

CN 102433486 machine translation of the description (Year: 2012).*
CN 105154707 A machine translation of the description (Year: 2015).*

* cited by examiner (1) Non-reacted part  (2), (3) Aluminum molten part (see FIG. 8)

METHOD FOR CRUSHING HARD TUNGSTEN CARBIDE SCRAPS

CROSS-REFERENCE TO RELATED APPLICATIONS

This application claims priority under 35 U.S.C. § 119 to Korean Patent Application No. 10-2015-0080502, filed on Jun. 8, 2015 and No. 10-2015-0080503, filed on Jun. 8, 2015 in the Korean Intellectual Property Office, the disclosure of which is incorporated herein by reference in its entirety.

TECHNICAL FIELD

The following disclosure relates to a method for crushing hard tungsten carbide scraps which is a process for recovering useful resources such as tungsten, cobalt used as a binder of tungsten carbide (WC) powder, etc., from hard tungsten carbide (WC) scraps such as chips, wires, bolts, drills, etc., that are metalworking tools to be discarded after being used, and more specifically, to a method for crushing hard tungsten carbide scraps including mixing hard tungsten carbide (WC) scraps with aluminum, followed by heating to a high temperature, to simultaneously form an intermetallic compound, metal oxides, or mixtures thereof from tungsten and cobalt contained in the hard tungsten carbide (WC) scraps, thereby preparing the intermetallic compound, the metal oxides, or the mixtures thereof in a sponge form, and then crushing the prepared intermetallic compound, the metal oxides, or the mixtures thereof in a sponge form, and to a method for recovering the tungsten and the cobalt from the crushed hard tungsten carbide (WC) scrap powder.

BACKGROUND

Generally, hard tungsten carbide (WC) scraps such as chips, wires, bolts, drills, etc., that are metalworking tools to be discarded after being used, contain about 70 to 92 wt % of tungsten, and about 3 to 25 wt % of high-priced metals such as cobalt used as a binder of tungsten carbide (WC) powder, etc., wherein amounts of the tungsten, cobalt, etc., may vary depending on kinds, production year, and forms of the hard tungsten carbide (WC) scrap. However, since it is difficult to perform crushing and leaching, recycling the tungsten and the cobalt raw materials from the hard tungsten carbide (WC) scraps has not been achieved.

The tungsten and the cobalt contained in waste of the hard tungsten carbide (WC) scraps such as chips, wires, bolts, drills, etc., that are metalworking tools to be discarded after being used, occupy a significantly important position as raw materials in high-tech industries such as tool steel, and are high value-added materials as high-priced resources, and accordingly, it is unfortunate to treat the tungsten and the cobalt as waste.

Accordingly, under a domestic situation in which a total amount of the tungsten and the cobalt depends on imports as a resource poor country, when the tungsten, the cobalt, etc., are recovered and recycled from the hard tungsten carbide (WC) scraps in view of recycling of resources, it is economically helpful for the countries and is effectively useful as a resource.

A process for recovering the tungsten and the cobalt from the hard tungsten carbide (WC) scraps such as chips, wires, bolts, drills, etc., that are metalworking tools to be discarded after being used essentially includes a process of crushing the tungsten carbide (WC) scraps and preparing the tungsten carbide (WC) scraps into powder in order to effectively recover the tungsten and the cobalt.

When the process for crushing the hard tungsten carbide (WC) scraps is a simple crushing process, it has problems in that a long period of time is required, energy is largely consumed, and a crusher to be used has problems in view of durability, and noise pollution is severe.

In order to solve these problems, Korean Patent Registration No. 10-1226614 suggests a method for separating and crushing tungsten and cobalt from hard tungsten carbide (WC) scraps by using zinc. However, this method has problems in that a repeat process of removing zinc used for separating and crushing the tungsten and the cobalt through volatilization requires a long period of time, energy is largely consumed, and it is not easy to achieve a processing condition in which zinc evaporation needs to be inhibited by minimizing oxygen during the process.

In addition, Korean Patent Registration No. 10-1431706 suggests a method for oxidizing hard tungsten carbide (WC) scraps under a high concentration of oxygen atmosphere and then crushing the oxidized hard tungsten carbide (WC) scraps. However, this method has problems in that a reaction rate at which the hard tungsten carbide (WC) scraps are oxidized by high concentration of oxygen is slow, such that a long period of processing time and a repeated oxidation process are required.

Therefore, the present disclosure provides a method for crushing hard tungsten carbide scraps including forming the tungsten and the cobalt contained in the hard tungsten carbide (WC) scraps into an intermetallic compound, and oxides in a sponge form by using aluminum, followed by crushing, and a method for recovering the tungsten and the cobalt from the crushed hard tungsten carbide (WC) scrap powder.

RELATED ART DOCUMENT (Patent Document 1) Korean Patent Registration No. KR 10-10-1226614
(Patent Document 2) Korean Patent Registration No. KR 10-10-1431706

SUMMARY

An embodiment of the present disclosure is directed to providing a method for crushing hard tungsten carbide (WC) scraps which is a pre-step of a recovery process for separating tungsten, cobalt, etc., from the hard tungsten carbide (WC) scraps to be discarded after being used, wherein the method for crushing hard tungsten carbide (WC) scraps has advantages in that it is simply performed by using aluminum, energy consumption is small, and a processing time is short.

In addition, another embodiment of the present disclosure is directed to providing a method for recovering tungsten and cobalt from the crushed hard tungsten carbide (WC) scrap powder through alkaline leaching and acid leaching.

In one general aspect, there is provided a method for crushing hard tungsten carbide (WC) scraps including: (a) a step of mixing hard tungsten carbide (WC) scraps with aluminum particles; (b) a step of forming an intermetallic compound, metal oxides, or mixtures thereof in a sponge form by heating the mixture obtained from step (a) to 1200° C. to 1400° C. and maintaining the mixture for 30 to 120 minutes; and (c) a step of crushing a product of step (b).

In another general aspect, there is provided a method for crushing hard tungsten carbide (WC) scraps including: (a1)

a step of mixing hard tungsten carbide (WC) scraps with aluminum particles; (b1) a step of heating the mixture obtained from step (a1) to 1200° C. up to 1400° C.; (b2) a step of forming an intermetallic compound, metal oxides, or mixtures thereof in a sponge form by maintaining the high temperature of 1200° C. to 1400° C.; and (c1) a step of crushing the intermetallic compound, the metal oxides, or the mixtures thereof in a sponge form obtained from step (b2) to be formed into powder.

(d) an alkaline leaching step of leaching a product of step (c) or step (c1) with an alkaline solution; (e) a primary solid-liquid separation step of separating a product of step (d) into sludge and a solution in which aluminum is dissolved; (f) an acid leaching step of mixing the sludge of step (e) with an acid solution; and (g) a secondary solid-liquid separation step of separating a product of step (f) into sludge and a solution in which cobalt is dissolved.

DETAILED DESCRIPTION OF EMBODIMENTS

As far as it is not defined in other ways, all technical and scientific terms used in the present specification have the same meaning as being generally appreciated by those skilled in the art to which the present disclosure pertains. In general, nomenclature used in the present specification and experimental methods to be described below are well known and generally used in the present technical field.

The present disclosure relates to a method for crushing hard tungsten carbide (WC) scraps including the following steps: (a) a step of mixing hard tungsten carbide (WC) scraps with aluminum particles; (b) a step of forming an intermetallic compound, a metal oxide or mixtures thereof in a sponge form by heating the mixture obtained from step (a) to 1200° C. to 1400° C. and maintaining the mixture for 30 to 120 minutes; and (c) a step of crushing a product of step (b).

The method for crushing hard tungsten carbide (WC) scraps using aluminum of the present disclosure is described in more detail with reference to FIG. 1.

Figure 1:
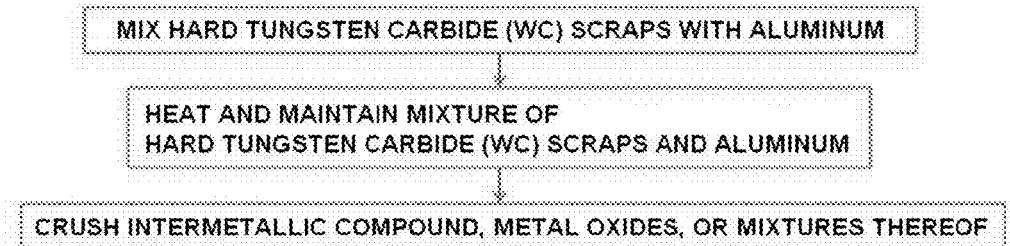
FIG. 1 is a block diagram showing a method for crushing hard tungsten carbide (WC) scraps according to an exemplary embodiment of the present disclosure.

FIG. 1 is a block diagram showing the method for crushing hard tungsten carbide (WC) scraps according to an exemplary embodiment of the present disclosure.

In the present disclosure, the method for crushing hard tungsten carbide (WC) scraps includes (a) a step of mixing hard tungsten carbide (WC) scraps with aluminum particles; (b) a step of forming an intermetallic compound, a metal oxide or mixtures thereof in a sponge form by heating the mixture obtained from step (a) to a high temperature; and (c) a step of crushing the intermetallic compound, the metal oxides, or the mixtures thereof in a sponge form obtained from step (b).

In the present disclosure, step (b) may be performed in air or under oxygen-free atmosphere. The oxygen-free atmosphere means a state without oxygen, and for example, one or two or more gaseous atmosphere selected from the group consisting of nitrogen, argon, helium and neon.

In the present disclosure, in step (a), 30 to 95 wt % of the hard tungsten carbide (WC) scraps may be mixed with 5 to 70 wt % of the aluminum particles.

When an amount of aluminum is less than 5 wt %, an amount of the aluminum particles is excessively small in step (b), such that it is difficult to prepare the intermetallic compound and the oxides with the hard tungsten carbide (WC). When the amount of aluminum is more than 70 wt %, a ratio of aluminum in the prepared intermetallic compound and the oxides in the sponge form is increased, such that binding force is increased so that it is difficult to be easily separated from the tungsten, whereby the crushing is difficult to be performed. Accordingly, the amount of the mixed aluminum particles is preferably between 5 wt % to 70 wt %.

As the aluminum used in the present disclosure, an aluminum metal having high purity of 98% or more is preferred. However, at the time of using aluminum obtained by washing waste aluminum metal and crushing or fine-grinding the washed aluminum metal to have an average diameter of 5 cm or less, the aluminum satisfying a purity of 70% or more, preferably, 90% or more, may be applied to the process of the present disclosure. In addition, the crushed aluminum particles or fine-ground aluminum particles preferably has a spherical granule shape, wherein the shape thereof is not limited, but is applicable to the process of the present disclosure as long as it has a particle shape in which dispersion and melting are easily performed.

In the present disclosure, step (b) is characterized in that the hard tungsten carbide (WC) scraps and the aluminum particles mixed in step (a) are loaded in an alumina crucible or a graphite crucible and put into an electric furnace, followed by heating to 1200° C. to 1400° C. for a predetermined time, and maintaining the mixture. This step is to form the intermetallic compound, metal oxides, or mixtures thereof in a sponge form that are easily crushed by heating the mixture to a high temperature for a predetermined time and maintaining the mixture.

In the present disclosure, the tungsten carbide (WC) scraps and the aluminum particles are heated to a high temperature in step (b), such that the cobalt used as a binder of the tungsten carbide (WC) comes out of the hard tungsten carbide (WC) scraps and is partially molten and mixed with the aluminum having a relatively low melting point at a high temperature, thereby forming unreacted tungsten carbide (WC) tungsten aluminum ($WAl_4$), and aluminum cobalt ($AlCo$, $Al_5Co_2$) intermetallic compounds into a compound having a sponge form. When the heating is performed in air in which oxygen is present, carbon (C) contained on a surface of the hard tungsten carbide (WC) additionally reacts with oxygen in the air to be discharged as carbon dioxide ($CO_2$), and a mixture of the hard tungsten carbide (WC) scraps and the aluminum is partially molten, such that cobalt tungstate ($CoWO_4$), tungsten oxide ($WO_3$), and aluminum oxide ($Al_2O_3$) are mixed.

In addition, by maintaining the mixture at the high temperature, the cobalt used as the binder of the tungsten carbide (WC) in the unreacted hard tungsten carbide (WC) scraps comes out of the hard tungsten carbide (WC) scraps, thereby forming fine holes. The aluminum enters the fine holes, such that tungsten aluminum ($WAl_4$), and aluminum cobalt ($AlCo$, $Al_5Co_2$) are produced to cause volume expansion, thereby forming the intermetallic compounds in a sponge form.

Additionally, when the heating is performed in air in which oxygen is present, the cobalt comes out of the hard tungsten carbide (WC) scraps, thereby forming fine holes. The aluminum and oxygen enter the fine holes, such that cobalt tungstate ($CoWO_4$), tungsten oxide ($WO_3$), and aluminum oxide ($Al_2O_3$) are produced to cause volume expansion, thereby forming the intermetallic compounds in a sponge form. In addition, carbon (C) included in the hard tungsten carbide (WC) scraps reacts with oxygen in the air to produce carbon dioxide ($CO_2$). The produced carbon dioxide ($CO_2$) is a gas and comes out of the intermetallic compound and oxides. Here, the carbon dioxide ($CO_2$) comes out of the intermetallic compound and oxides to form holes in the intermetallic compound and oxides, thereby forming the intermetallic compound, the metal oxides or the mixtures thereof in a sponge form.

The heating of the tungsten carbide (WC) scraps and the aluminum particles at a high temperature is preferably performed by using an electric furnace. When a temperature of the electric furnace is lower than 1200° C., the cobalt used as the binder of the tungsten carbide (WC) does not sufficiently come out of the hard tungsten carbide (WC) scraps, such that cobalt tungstate ($CoWO_4$), tungsten oxide ($WO_3$), tungsten aluminum ($WAl_4$), aluminum cobalt ($AlCo$, $Al_5Co_2$), and aluminum oxide ($Al_2O_3$) may not be produced, and the intermetallic compound and the oxides may not be formed, and accordingly, the temperature of the electric furnace is required to be 1200° C. or more.

When a temperature of the electric furnace heating the tungsten carbide (WC) scraps and the aluminum particles is higher than 1400° C., the cobalt used as the binder of the tungsten carbide (WC) easily comes out of the tungsten carbide (WC) scraps, and reacts with a mixture of the hard tungsten carbide (WC) and molten aluminum, thereby forming the intermetallic compound and the oxides. When the hard tungsten carbide (WC) scraps and the aluminum particles are heated to a higher temperature than 1400° C., since equipments such as an electric furnace, crucible, etc., are required to endure at a higher temperature than 1400° C., high-priced equipments need to be used. At a temperature between 1200° C. to 1400° C., the mixture of the hard tungsten carbide (WC) and the aluminum particles may be molten without high-priced equipments to form the intermetallic compound and the oxides into the intermetallic compound and oxides in a sponge form, thereby being easily crushed.

A time for heating the hard tungsten carbide (WC) scraps and the aluminum particles is preferably 10 minutes to 30 minutes, but a final heating time is determined depending on amount of materials to be molten or a size of the electric furnace. In addition, a time for maintaining the hard tungsten carbide (WC) scraps and the aluminum particles between 1200° C. to 1400° C. is preferably 30 minutes to 120 minutes so that the cobalt sufficiently reacts with tungsten, aluminum and oxygen to form the intermetallic compound and the oxides in a sponge form, but a final heating time is determined depending on amount of materials to be molten or a size of the electric furnace.

As the amount of carbon (C) and cobalt separated from the hard tungsten carbide (WC) is increased, the intermetallic compound and the oxides having a number of holes are produced to be formed into a sponge form which is easily crushed, such that a sufficient reaction time of 30 minutes or more is required. When a time for heating and maintaining the hard tungsten carbide (WC) scraps and the aluminum particles in the electric furnace is smaller than 30 minutes, the cobalt used as the binder of the hard tungsten carbide (WC) does not sufficiently separate from the hard tungsten carbide (WC), such that the sponge form may not be sufficiently formed. In addition, when the heating is performed in the presence of oxygen, a reaction between carbon and air is not sufficiently performed, such that the sponge form is not sufficiently formed, whereby it is difficult to perform crushing.

A reaction in which the cobalt as the binder of the hard tungsten carbide (WC) comes out and the carbon contained in the hard tungsten carbide (WC) reacts with the air at the reaction temperature to be removed as carbon dioxide is performed within 120 minutes. When the reaction is maintained longer than 120 minutes, energy required for maintaining the temperature is largely consumed, such that a time for maintaining the mixture after the heating is preferably 30 minutes or more to 120 minutes or less.

The hard tungsten carbide (WC) and the aluminum of the present disclosure form the intermetallic compound, the metal oxides, or the mixtures thereof at a high temperature between 1200° C. to 1400° C., such that it is preferable to use an alumina crucible or a graphite crucible that are stable without damage even at a high temperature.

The intermetallic compound and the oxides in a sponge form obtained from step (b) may be subjected to a cooling process after being sufficiently formed into a sponge form and before being crushed. When the cooling process is not performed, a crusher may be damaged by the intermetallic compound and the oxides in a sponge form present at a high temperature, such that it is preferred to have a sufficient cooling time. Specifically, the cooling process is performed in an electric furnace from 200° C. up to 250° C., and when the temperature is between 200° C. to 250° C., the intermetallic compound and the oxides are taken out from the electric furnace and cooled to room temperature, followed by crushing.

In the present disclosure, step (c), i.e., the crushing of the intermetallic compound and the oxides in the sponge form obtained from step (b) is characterized in that the intermetallic compound and the oxides in the sponge form are prepared into powder having a size of 0.5 mm or less.

The intermetallic compound and the oxides in the sponge form obtained from step (b) are easily crushed due to fragility of the intermetallic compound and the oxides as well as the sponge form. The intermetallic compound and the oxides in the sponge form that are easily crushed are crushed into powder having a diameter of 0.5 mm or less by using the crusher.

When a size of the powder is larger than 0.5 mm, the powder is not easily dissolved in an alkaline leaching solution and an acid leaching solution used for a process for recovering tungsten and cobalt, such that the size of powder is preferably 0.5 mm or less in order to increase a recovery rate and an efficiency of the process for recovering tungsten and cobalt. The size of the powder is preferably 0.01 to 0.4 mm, and more preferably, 0.01 to 0.3 mm.

According to another preferable exemplary embodiment of the present disclosure, there is provided a method for crushing hard tungsten carbide (WC) scraps including: (a1) a step of mixing hard tungsten carbide (WC) scraps with aluminum particles; (b1) a step of heating the mixture obtained from step (a1) to 1200° C. up to 1400° C.; (b2) a step of forming an intermetallic compound, metal oxides, or mixtures thereof in a sponge form by maintaining at the high temperature of 1200° C. to 1400° C.; and (c1) a step of crushing the intermetallic compound, the metal oxides, or the mixtures thereof in a sponge form obtained from step (b2) to be formed into powder.

The present disclosure provides a method for recovering tungsten and cobalt from crushed hard tungsten carbide (WC) scrap powder.

The method for recovering tungsten and cobalt from hard tungsten carbide (WC) scrap powder includes (d) an alkaline leaching step of mixing a product of step (c) or step (c1) with an alkaline solution; (e) a primary solid-liquid separation step of separating a product of step (d) into sludge and a solution; (f) an acid leaching step of mixing the sludge of step (e) with an acid solution; and (g) a secondary solid-liquid separation step of separating a product of step (f) into sludge and a solution.

In another aspect, the present disclosure relates to a method for recovering tungsten and cobalt from hard tungsten carbide (WC) scrap powder including the following steps: (d) an alkaline leaching step of mixing the crushed hard tungsten carbide (WC) scrap powder with an alkaline solution; (e) a primary solid-liquid separation step of separating a product of step (d) into sludge and a solution in which aluminum is dissolved; (f) an acid leaching step of mixing the sludge of step (e) with an acid solution; and (g) a secondary solid-liquid separation step of separating a product of step (f) into sludge and a solution in which cobalt is dissolved.

The method for recovering tungsten and cobalt from the hard tungsten carbide (WC) scrap powder of the present disclosure is described in more detail with reference to FIG. 2.

Figure 2:
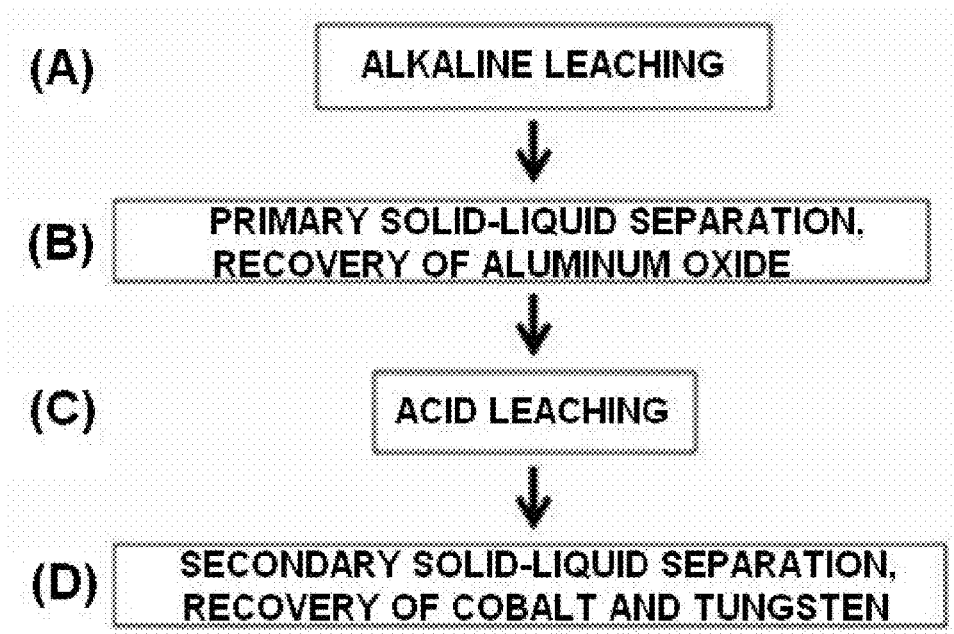
FIG. 2 is a process diagram showing a method for recovering tungsten and cobalt form the hard tungsten carbide (WC) scraps according to an exemplary embodiment of the present disclosure.

FIG. 2 is a process diagram showing a method for recovering tungsten and cobalt form the hard tungsten carbide (WC) scraps according to an exemplary embodiment of the present disclosure.

In the present disclosure, the hard tungsten carbide (WC) scrap powder prepared by the method for crushing the hard tungsten carbide (WC) scrap using aluminum is characterized by recovering tungsten and cobalt according to the method for recovering tungsten and cobalt of FIG. 2.

The hard tungsten carbide (WC) scrap powder prepared by the method for crushing the hard tungsten carbide (WC) scraps using aluminum, the method including a step of mixing aluminum and hard tungsten carbide (WC) scraps, a step of forming an intermetallic compound, metal oxides, or mixtures thereof in a sponge form after the hard tungsten carbide (WC) scraps and aluminum are partially molten, a step of crushing a mixture of the prepared intermetallic compound, the metal oxides, or the mixtures thereof is subjected to the recovery process including (d) an alkaline leaching step of mixing the hard tungsten carbide (WC) scrap powder with an alkaline solution; (e) a primary solid-liquid separation step of separating a product of step (d) into sludge and a solution in which aluminum is dissolved; (f) an acid leaching step of mixing the sludge of step (e) with an acid solution; and (g) a secondary solid-liquid separation step of separating a product of step (f) into sludge and a solution in which cobalt is dissolved, thereby recovering tungsten and cobalt.

In the present disclosure, step (d), i.e., the alkaline leaching step of mixing the hard tungsten carbide (WC) scrap powder with the alkaline solution is characterized by mixing the hard tungsten carbide (WC) scrap powder with an aqueous alkali solution in which sodium cyanide (NaCN), sodium carbonate ($Na_2CO_3$), ammonium carbonate (($NH_4)_2CO_3$), sodium hydroxide (NaOH), ammonia ($NH_3$), etc., are dissolved in water, wherein the hard tungsten carbide (WC) scrap powder is prepared by the method for crushing the hard tungsten carbide (WC) scraps of the present disclosure, the method including the step of mixing aluminum and hard tungsten carbide (WC) scraps, the step of forming an intermetallic compound, metal oxides, or mixtures thereof in a sponge form after heating, and the step of crushing a mixture of the prepared intermetallic compound, the metal oxides, or the mixtures thereof in a sponge form.

The alkaline leaching is a leaching method using an aqueous alkali solution in which a material having strong basicity when being dissolved in water is dissolved in water. Accordingly, when the hard tungsten carbide (WC) scrap powder is mixed with the aqueous alkali solution, only the aluminum in the hard tungsten carbide (WC) scrap powder reacts with the aqueous alkali solution and is dissolved in the aqueous alkali solution, and cobalt and tungsten are not dissolved, but remain in a sludge state.

The alkaline leaching is characterized in that the aqueous alkali solution reacts only with a desired metal, and accordingly, an amount of the aqueous alkali solution to be used is small.

In the present disclosure, step (e), i.e., the primary solid-liquid separation step of separating the product of step (d) into sludge and a solution in which aluminum is dissolved is characterized by separating the product of step (d) into the aqueous alkali solution in which aluminum is dissolved and cobalt and tungsten sludge.

The aqueous alkali solution in which aluminum is dissolved is present in a liquid state, and the cobalt and tungsten sludge is a solid, such that it is possible to separate the aqueous alkali solution and the cobalt and tungsten sludge from each other.

Aluminum oxide may be recovered from the aqueous alkali solution separated by the solid-liquid separation.

In the present disclosure, step (f), i.e., the acid leaching step of mixing the sludge of step (e) with an acid solution is characterized by mixing the cobalt and tungsten sludge obtained from step (e) with an aqueous acid solution in which sulfuric acid ($H_2SO_4$), nitric acid ($HNO_3$), hydrochloric acid (HCl), etc., are dissolved in water.

The acid leaching is a leaching method using an aqueous acid solution in which a material having strong acidity when being dissolved in water is dissolved in water. Accordingly, when the sludge obtained from step (e) is mixed with the aqueous acid solution, only the cobalt in the slurry reacts with the aqueous acid solution and is dissolved in the aqueous acid solution, and tungsten is not dissolved, but remains in a sludge state.

The acid leaching is characterized in that a leaching reaction is rapidly performed.

In the present disclosure, step (g), i.e., the secondary solid-liquid separation step of separating the product of step (f) into sludge and a solution in which cobalt is dissolved is characterized by separating the product of step (f) into the aqueous acid solution in which cobalt is dissolved and tungsten sludge.

The aqueous acid solution in which cobalt is dissolved is present in a liquid state, and the tungsten sludge is a solid, such that it is possible to separate the aqueous acid solution and the tungsten sludge from each other.

The cobalt may be recovered from the aqueous acid solution separated by the solid-liquid separation and the tungsten may be recovered from the sludge.

Example 1

Hard tungsten carbide (WC) scraps (100 g) to be discarded after being used was mixed with aluminum (50 g) and loaded in a graphite crucible and put into an electric furnace. The mixture was heated to a high temperature of 1400° C. for 10 minutes in the air, and maintained at 1200° C. to 1400° C. for 60 minutes in the air, thereby forming an intermetallic compound and oxides in a sponge form. When a temperature was 200° C. or less, the obtained intermetallic compound and oxides in a sponge form were taken out from the electric furnace and cooled to room temperature, followed by crushing into powder having a diameter of 0.01 to 0.5 mm. The hard tungsten carbide (WC) scraps were crushed at 200 rpm for 20 minutes using a planetary ball mill crusher. As a result, it was confirmed that at a crushing rate of the hard tungsten carbide (WC) treated by the process of the present disclosure, the powder having a diameter of 5 mm or less occupied 95 to 98 wt % of the total crushed products; on the contrary, at a crushing rate of the hard tungsten carbide (WC) that was not treated with the process of the present disclosure, the powder having a diameter of 5 mm or less occupied 30 to 40 wt % of the total crushed products. In addition, it was confirmed that a volume expansion rate of the intermetallic compound and the oxides in a sponge form to which the process of the present disclosure was applied was 150 wt % to 220 wt %.

Figure 3:
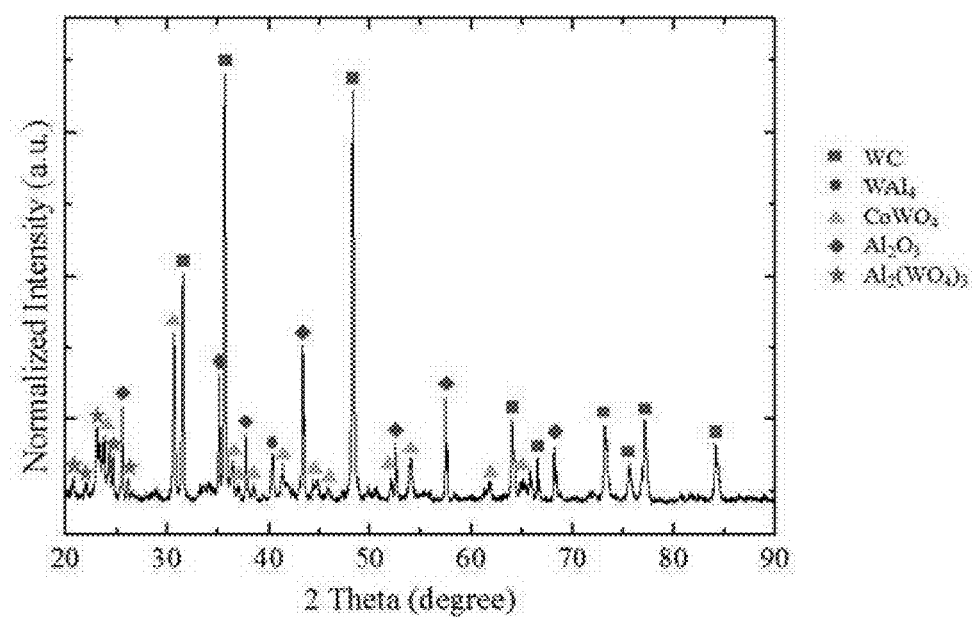
FIG. 3 shows XRD analysis of hard tungsten carbide (WC) scrap powder according to an exemplary embodiment of the present disclosure.

It could be appreciated from FIG. 3 showing XRD analysis of the hard tungsten carbide (WC) scrap powder according to Example 1 that the hard tungsten carbide (WC) scraps and the aluminum were molten and reacted with each other, such that cobalt tungstate ($CoWO_4$), tungsten oxide ($WO_3$), tungsten aluminum ($WAl_4$), aluminum cobalt (AlCo), and aluminum oxide ($Al_2O_3$) were formed.

Figure 4:
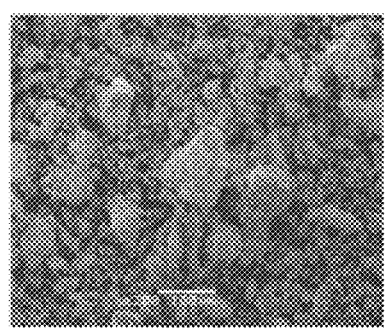
FIG. 4 is an enlarged view of hard tungsten carbide (WC) scrap powder according to an exemplary embodiment of the present disclosure.

It could be appreciated from FIG. 4 which is an enlarged view of the hard tungsten carbide (WC) scrap powder according to Example 1 of the present disclosure that the crushed hard tungsten carbide (WC) scrap powder had a sponge form.

Figure 5:
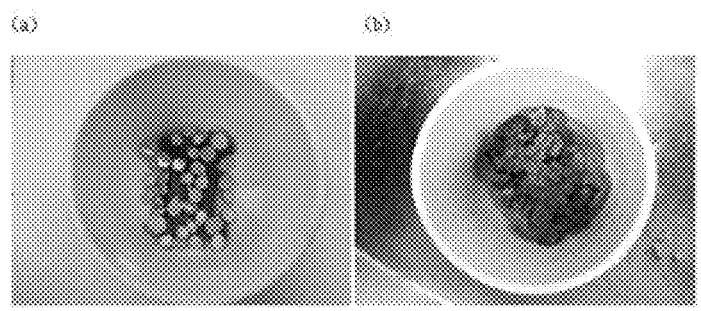
FIG. 5 is an image of the hard tungsten carbide (WC) scraps before being processed and an image of a product in a sponge form after being processed according to an exemplary embodiment of the present disclosure.

It could be confirmed from FIGS. 5(a) and 5(b) which are an image of the hard tungsten carbide (WC) scraps before being processed and an image of a product obtained after being processed (molten) according to an exemplary embodiment of the present disclosure that the tungsten carbide (WC) scraps were changed into the intermetallic compound and the oxides in a sponge form.

Example 2

Hard tungsten carbide (WC) scraps (100 g) to be discarded after being used was mixed with aluminum (50 g) having a purity of 98% and loaded in a graphite crucible and put into an electric furnace. The mixture was heated to a high temperature of 1400° C. for 10 minutes under an argon atmosphere, and maintained at 1200° C. to 1400° C. for 60 minutes under the argon atmosphere, thereby forming an intermetallic compound in a sponge form. When a temperature was 200° C. or less, the obtained intermetallic compound in a sponge form were taken out from the electric furnace and cooled to room temperature, followed by crushing into powder having a diameter of 0.01 to 0.5 mm. The hard tungsten carbide (WC) scraps were crushed at 200 rpm for 20 minutes using a planetary ball mill crusher. As a result, it was confirmed that at a crushing rate of the hard tungsten carbide (WC) treated by the process of the present disclosure, the powder having a diameter of 5 mm or less occupied 95 to 98 wt % of the total crushed products; on the contrary, at a crushing rate of the hard tungsten carbide (WC) that was not treated with the process of the present disclosure, the powder having a diameter of 5 mm or less occupied 30 to 40 wt % of the total crushed products. In addition, it was confirmed that a volume expansion rate of the intermetallic compound and the oxides in a sponge form to which the process of the present disclosure was applied was 150 wt % to 220 wt %.

Figure 6:
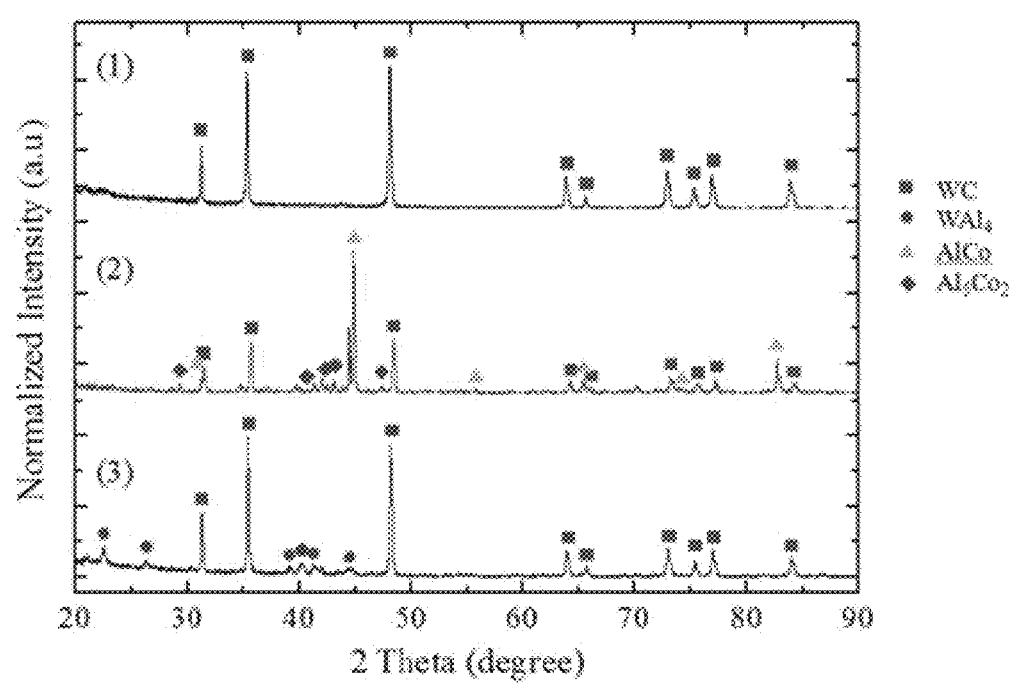
FIG. 6 shows XRD analysis of hard tungsten carbide (WC) scrap powder according to an exemplary embodiment of the present disclosure.

It could be appreciated from FIG. 6 showing XRD analysis of the hard tungsten carbide (WC) scrap powder according to Example 2 that the hard tungsten carbide (WC) scrap powder and the aluminum were molten and reacted with each other, such that tungsten aluminum ($WAl_4$) and aluminum cobalt (AlCo, $Al_5Co_2$) were formed.

Figure 7:
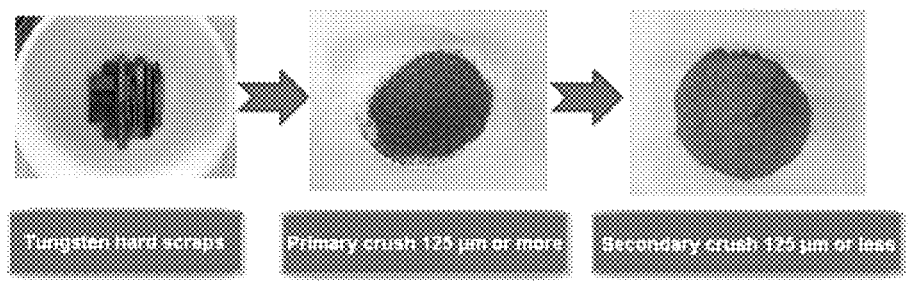
FIG. 7 shows an image of the hard tungsten carbide (WC) scraps and an image of the hard tungsten carbide (WC) scrap powder crushed after being processed according to an exemplary embodiment of the present disclosure.

From FIG. 7 which is a particle image of the hard tungsten carbide (WC) scrap powder crushed according to Example 2 of the present disclosure, easiness for crushing the crushed hard tungsten carbide (WC) scraps as powder could be confirmed.

Figure 8:
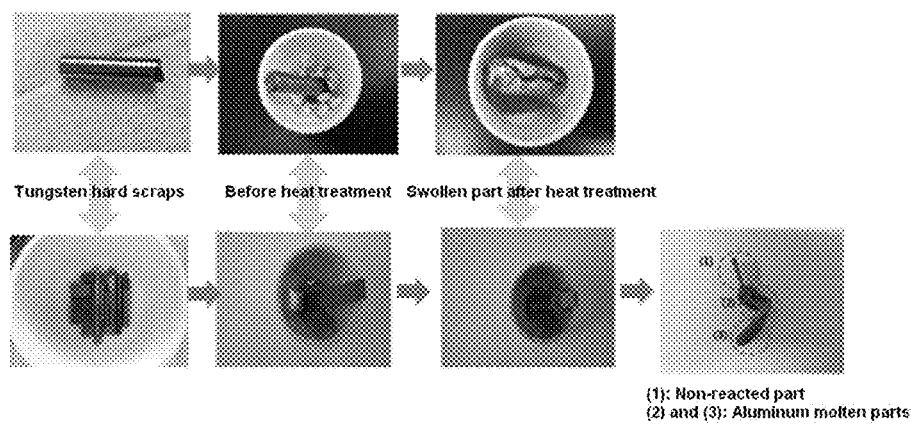
FIG. 8 shows images of the hard tungsten carbide (WC) scraps according to an exemplary embodiment of the present disclosure for each crushing step.

It could be confirmed from FIG. 8 showing images of the hard tungsten carbide (WC) scraps according to Example 2 for each crushing step that the tungsten carbide (WC) scraps were changed into the intermetallic compound in a sponge form.

As set forth above, the present disclosure provides a method for crushing hard tungsten carbide (WC) scraps, and a method for recovering tungsten and cobalt from hard tungsten carbide (WC) scrap powder. According to the method of the present disclosure, only aluminum is heated to a high temperature and reacts with the tungsten and cobalt contained in the hard tungsten carbide (WC) scraps, thereby forming an intermetallic compound, metal oxides, or mixtures thereof in a sponge form, such that the hard tungsten carbide (WC) scraps may be easily crushed. Therefore, the method for crushing hard tungsten carbide (WC) scraps has advantages in that it is simply performed, energy consumption is small, and a processing time is short, and the cobalt and the tungsten may be separated and recovered by using alkaline leaching and acid leaching methods.

Although specific exemplary embodiments of the present disclosure have been shown and described above, it will be apparent to those skilled in the art that modifications and variations could be easily made without departing from the scope of the present disclosure as defined by the following appended claims.

What is claimed is:

1. A method for crushing hard tungsten carbide (WC) scraps comprising:
    (a) a step of mixing hard tungsten carbide (WC) scraps with aluminum particles to produce a mixture;
    (b) a step of forming a product comprising an intermetallic compound, metal oxides, or mixtures thereof in a sponge form by heating the mixture obtained from step (a) to 1200° C. to 1400° C. and maintaining the mixture for 30 to 120 minutes; and
    (c) a step of crushing the product of step (b), wherein the mixing of step (a) is performed such that the mixture comprises 30-95 wt % of the hard tungsten carbide (WC) and 5-70 wt % of the aluminum particles.

2. The method of claim 1, wherein step (b) is performed in air.

3. The method of claim 1, wherein step (b) is performed under oxygen-free atmosphere.

4. The method of claim 3, wherein the oxygen-free atmosphere is one or more gaseous atmosphere selected from the group consisting of nitrogen, argon, helium, and neon.

5. The method of claim 1, wherein in step (c), the product of step (b) is cooled to room temperature and then, crushed into a size having a diameter of 0.5 mm or less.

6. A method for recovering tungsten and cobalt from hard tungsten carbide (WC) scrap comprising:
(a) a step of mixing hard tungsten carbide (WC) scraps with aluminum particles to produce a mixture;
(b) a step of forming a product comprising an intermetallic compound, metal oxides, or mixtures thereof in a sponge form by heating the mixture obtained from step (a) to 1200° C. to 1400° C. and maintaining the mixture for 30 to 120 minutes;
(c) a step of crushing the product of step (b);
(d) an alkaline leaching step of leaching the crushed product of step (c) with an alkaline solution to produce a sludge and a solution in which aluminum is dissolved;
(e) a primary solid-liquid separation step of separating the sludge and the solution in which aluminum is dissolved obtained in step (d);
(f) an acid leaching step of mixing the sludge of step (e) with an acid solution to produce a sludge and a solution in which cobalt is dissolved; and
(g) a secondary solid-liquid separation step of separating the sludge and the solution in which cobalt is dissolved obtained in step (f),
wherein the mixing of step (a) is performed such that the mixture comprises 30-95 wt % of the hard tungsten carbide (WC) and 5-70 wt % of the aluminum particles.

7. The method of claim 6, wherein the alkaline solution is one or more selected from the group consisting of sodium cyanide (NaCN), sodium carbonate ($Na_2CO_3$), ammonium carbonate (($NH_4)_2CO_3$), sodium hydroxide (NaOH) and ammonia ($NH_3$).

8. The method of claim 6, wherein the acid solution is one or more selected from the group consisting of sulfuric acid ($H_2SO_4$), nitric acid ($HNO_3$) and hydrochloric acid (HCl).

* * * * *